(12) United States Patent
Izawa et al.

(10) Patent No.: US 10,112,506 B2
(45) Date of Patent: Oct. 30, 2018

(54) VEHICLE SEAT

(71) Applicant: TS TECH CO., LTD., Asaka-shi, Saitama (JP)

(72) Inventors: Hiroshi Izawa, Tochigi (JP); Makoto Takeuchi, Tochigi (JP); Akimitsu Kurihara, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/326,864

(22) PCT Filed: Jul. 22, 2015

(86) PCT No.: PCT/JP2015/070787
§ 371 (c)(1),
(2) Date: Jan. 17, 2017

(87) PCT Pub. No.: WO2016/013564
PCT Pub. Date: Jan. 28, 2016

(65) Prior Publication Data
US 2017/0210252 A1    Jul. 27, 2017

(30) Foreign Application Priority Data
Jul. 23, 2014  (JP) .................................. 2014-150165

(51) Int. Cl.
*B60N 2/16*       (2006.01)
(52) U.S. Cl.
CPC .............. *B60N 2/16* (2013.01); *B60N 2/161* (2013.01)

(58) Field of Classification Search
CPC ................................. B60N 2/16; B60N 2/161
USPC ...................................................... 297/344.12
See application file for complete search history.

(56) References Cited

U.S. PATENT DOCUMENTS

2009/0127907 A1   5/2009  Hoshi et al.
2010/0109406 A1   5/2010  Ueda

FOREIGN PATENT DOCUMENTS

| JP | 06-045844 U | 6/1994 | |
| JP | 2006-282020 A | 10/2006 | |
| JP | 2007-196897 A | 8/2007 | |
| JP | 2009-012548 A | 1/2009 | |
| WO | WO-2014077389 A1 * | 5/2014 | ........... B60N 2/1615 |

* cited by examiner

*Primary Examiner* — Anthony D Barfield
(74) *Attorney, Agent, or Firm* — Drinker Biddle & Reath LLP

(57) ABSTRACT

Provided is a vehicle seat including a height device for moving up and down a seat body and being capable of suppressing a positional displacement of the height device. A vehicle seat includes a cushion frame serving as a framework of a seating portion, a height device for moving the cushion frame up and down, and a side cover that covers the cushion frame and the height device from the outsides thereof in the seat width direction. An operation lever and a brake unit, which serve as components of the height device, are disposed separated from each other. The operation lever is positioned to be engaged with a positioning member housed in an outer surface of the side cover.

15 Claims, 6 Drawing Sheets

VEHICLE SEAT

CROSS-REFERENCE TO RELATED APPLICATIONS

This application is a National Stage Entry application of PCT Application No. PCT/JP2015/070787, filed Jul. 22, 2015, which claims the priority benefit of Japanese Patent Application No. 2014-150165, filed on Jul. 23, 2014, the contents being incorporated herein by reference.

BACKGROUND

The present disclosure relates to a vehicle seat and particularly relates to embodiments of a vehicle seat including a height device that connects a seat body and a vehicle body floor such that the seat body is movable up and down relative to the vehicle body floor.

There has been a well-known vehicle seat including a height device that connects a seat cushion serving as a seating portion of a seat body and a vehicle body floor such that the seat cushion is movable up and down relative to the vehicle body floor. Generally, the height device is attached between the seat cushion and the vehicle body floor, and includes a pair of front links provided on a front side of the seat and a pair of rear links provided on a rear side of the seat. One of the rear links serving as a drive link can adjust the height of the seat body. In addition, an operation lever for driving the height device is attached outward of the drive link in a seat width direction. A brake unit for restricting the drive of the height device is provided between the drive link and the operation lever, for example, as described in Japanese Patent Publication JP 2009-12548 A.

A vehicle seat described in Japanese Patent Publication JP 2009-12548 A mainly includes a seat cushion, a lifter corresponding to the height device, and a resin trim covering the seat cushion and the lifter from the outside in the seat width direction. The operation lever and the brake unit of the lifter are disposed separated from each other in a seat front-to-back direction. Power transmission means from the operation lever to the brake unit is formed from a parallel four-bar linkage. The above configuration improves the operability of the operation lever by a passenger, and enhances the degree of freedom for arrangement of the operation lever, thereby promoting the communization of the operation lever and the height device.

In a vehicle seat including a height device, at the time of the assembly of the height device, positional displacement may occur in the assembled height device due to dimensional tolerance, assembly tolerance, and welding tolerance, etc. of components thereof. In addition, the positional displacement of an operation lever may affect a seat appearance. Particularly, in the vehicle seat in Japanese Patent Publication JP 2009-12548 A, since the operation lever and the brake unit are disposed separated from each other, the operability of the operation lever is improved. However, the number of components such as a parallel four-bar linkage may be increased, and the positional displacement may be likely to occur in the height device. Thus, a technique has been desired to easily position the height device and suppress the positional displacement at the time of the assembly of the height device.

In addition, in a vehicle seat including a height device, in order to protect a seat cushion and a height device from the outside in the seat width direction, generally, a resin side cover is attached to an outer surface of the seat cushion. The side cover is elongated in the seat front-to-back direction, and then multiple members for securely attaching the side cover are required. Particularly, in the vehicle seat in Japanese Patent Publication JP 2009-12548 A, the operation lever and the brake unit are disposed separated from each other, thereby complicating the shape of the side cover covering these components of the height device. Therefore, multiple attachment members for the side cover are further required. Thus, a device has been desired to reduce the number of components while securely attaching the side cover for protecting the seat body and the height device from the outside thereof.

SUMMARY

The present disclosure has been made in view of the above problems. Various embodiments of the present disclosure provide a vehicle seat that includes a height device for moving up and down a seat body and is capable of easily positioning the height device and suppressing a positional displacement of the height device. Some embodiments of the present disclosure provide a vehicle seat securing a design of an entire seat including an operation lever of the height device. Some embodiments of the present disclosure provide a vehicle seat suppressing the positional displacement of the height device and securing a design of an entire seat in a configuration where the operation lever and a brake unit of the height device are disposed separated from each other. Some embodiments of the present disclosure provide a vehicle seat capable of reducing the number of components while securely attaching a side cover for protecting the seat body and the height device from the outside thereof.

At least some of the above problems are solved by various embodiments of a vehicle seat according to the present disclosure. In an embodiment, the vehicle seat includes: a cushion frame serving as a framework of a seating portion; and a height device connecting the cushion frame and a vehicle body floor such that the cushion frame is movable up and down relative to the vehicle body floor. The height device includes an operation lever for moving up and down the cushion frame, the operation lever being attached to an outer surface of the cushion frame in a seat width direction to be rotatable around a supporting shaft, and a positioning portion is provided outward of the cushion frame in the seat width direction to position the operation lever.

According to the above configuration, the operation lever of the height device is positioned by the positioning portion provided outward of the cushion frame. Therefore, the vehicle seat capable of suppressing the positional displacement of the operation lever that occurs at the time of the assembly of the height device can be achieved. In addition, since the operation lever exposed to the outside of the seat body is positioned by the positioning portion, the design of the entire seat including the operation lever can be secured.

The vehicle seat may include a side cover covering the cushion frame and the height device from the outside in the width direction. The operation lever may be disposed to protrude outward of the side cover, and the positioning portion may be provided in the side cover. In addition, the positioning portion may be provided on an outer surface of the side cover. According to the above configuration, using the side cover, the operation lever of the height device is positioned by the positioning portion provided on the outer surface of the side cover, thereby suppressing the positional displacement of the operation lever.

The positioning portion may be a positioning member provided separately from the side cover and attached to the side cover while being supported by the side cover, and the operation lever may be disposed to rotate relative to the positioning member while an engaging portion provided on an inner surface of the operation lever is engaged with a portion to be engaged provided in the positioning member. According to the above configuration, since the positioning member is provided separately from the side cover, the shape and the arrangement of the positioning member can be freely set. In addition, since the operation lever is disposed to rotate relative to the positioning member while being engaged with the positioning member, the positional displacement of the operation lever can be further suppressed.

The positioning member may be housed in a housing recess provided on an outer surface of the side cover. According to the above configuration, a compact vehicle seat in the seat width direction can be achieved. In addition, the positioning member is securely supported by the side cover.

The positioning member may be disposed between the side cover and the operation lever in the seat width direction, and may be attached coaxially with the operation lever. According to the above configuration, the positional displacement of the operation lever can be further suppressed, and the design of the operation lever can be secured.

The positioning member may be made of an elastically deformable resin material. According to the above configuration, the positioning member is made of the elastically deformable material. Therefore, when the operation lever rotates while being engaged with the positioning member, the operation lever exhibits improved sliding performance relative to the positioning member.

The engaging portion may be an engagement protrusion protruding from the inner surface of the operation lever toward the positioning member, the portion to be engaged may be an engagement hole extending through a lateral surface of the positioning member and extending along a same circumference centered around the supporting shaft, and the engagement protrusion may be disposed to move inside the engagement hole in accordance with a rotation of the operation lever. According to the above configuration, the operation lever can further favorably rotate centered around the supporting shaft while being supported by the positioning member.

A stepped portion may be formed in the engagement hole to have a narrower width than the engagement protrusion in a radial direction centered at the supporting shaft, the stepped portion being provided around a center portion of the engagement hole in an extending direction of the engagement hole, and the engagement protrusion may be provided to rotate centered around the supporting shaft within a rotation range in accordance with the rotation of the operation lever and may be disposed to be in contact with the stepped portion at an intermediate position within the rotation range. According to the above configuration, when the operation lever is positioned at the intermediate position within the rotation range, the engagement protrusion of the operation lever is in contact with the stepped portion provided in the engagement hole of the positioning member. Therefore, the operation lever is securely supported at the intermediate position serving as a reference position thereof. In addition, generally, when the operation lever of the height device is moved to an upper end within the rotation range, the seat body moves up, and when the operation lever is moved to a lower end within the rotation range, the seat body moves down. Therefore, when the operation lever is moved from the intermediate position within the rotation range, the engagement protrusion is brought into contact with the stepped portion in the engagement hole, thereby generating a "click" feeling. As a result, an operation feeling of a passenger is improved. Furthermore, in an engagement hole portion of the positioning member, a center portion and a surrounding area thereof is likely to bend compared to end portions and surrounding areas thereof. Therefore, the stepped portion is provided at the center portion and the surrounding area thereof to improve the operation feeling of the operation lever.

The stepped portion may include a first stepped portion and a second stepped portion that are disposed at different positions in the extending direction, and the engagement protrusion may be disposed between the first stepped portion and the second stepped portion in the extending direction at the intermediate position within the rotation range. According to the above configuration, when the operation lever is positioned at the intermediate position, the engagement protrusion of the operation lever is held between the first and the second stepped portions of the engagement hole. Therefore, the operation lever is further securely supported at the intermediate position. In addition, when the operation lever is moved from the intermediate position, the engagement protrusion is brought into contact with the first stepped portion or the second stepped portion of the engagement hole, thereby further generating a click feeling. As a result, an operation feeling of a passenger is further improved.

The supporting shaft may be a lever supporting shaft, the height device may include a brake unit attached to a lateral surface of the cushion frame to be rotatable around a brake rotary shaft, the brake unit providing a resistance to an operation of moving up and down the cushion frame, the lever supporting shaft and the brake rotary shaft may be disposed at different positions in a seat front-to-back direction, and the operation lever and the brake unit may be connected to operate in accordance with each other. According to the above configuration, in the configuration where the operation lever and the brake unit of the height device are disposed separated from each other, the positional displacement of the operation lever can be suppressed, and the design of the entire seat can be secured.

The engagement protrusion may be disposed on the opposite side of the lever supporting shaft from portions of the operation lever, which are connected with each other such that the brake unit accordingly operates. According to the above configuration, the interference between components of a vehicle seat can be suppressed in a surrounding area of the operation lever.

The operation lever may be disposed at generally the same height as or at a lower position than an upper surface of the side cover when the operation lever is positioned at an intermediate position within a rotation range centered around the supporting shaft. According to the above configuration, the operation lever does not protrude above the side cover when being positioned at the intermediate position serving as a reference position of the operation lever. Therefore, the design of the entire seat including the operation lever can be secured.

The vehicle seat may further include a side cover covering the cushion frame and the height device from the outside in the seat width direction. The supporting shaft may be provided to protrude outward from a lateral surface of the cushion frame in the seat width direction and be disposed to extend through a shaft hole provided on a lateral surface of the side cover in the seat width direction to support the side cover. As described above, using the support shaft supporting the operation lever of the height device, the supporting shaft supports the side cover covering the cushion frame from the outside in the seat width direction. Therefore, a vehicle seat capable of suppressing the number of attachment components while securely attaching the side cover can be achieved. In addition, since the side cover exposed to the outside of the seat body is supported by the supporting shaft, the looseness and the positional displacement of the side cover can be suppressed, and the design of the entire seat including the side cover can be secured.

A surrounding portion of the shaft hole in the side cover may be a recess that is recessed in the seat width direction. According to the above configuration, since a recess portion of the side cover having the higher rigidity is supported by the supporting shaft, the side cover can be further securely attached.

According to an embodiment of the present disclosure, since the operation lever of the height device is positioned by the positioning portion provided outward of the cushion frame, a vehicle seat capable of suppressing the positional displacement of the operation lever can be achieved. In addition, the operation lever exposed to the outside of the seat body is positioned by the positioning portion, thereby securing the design of the entire seat including the operation lever.

According to an embodiment of the present disclosure, using the side cover, the operation lever of the height device is positioned by the positioning portion provided on the outer surface of the side cover, thereby suppressing the positional displacement of the operation lever. According to an embodiment of the present disclosure, since the positioning member is separately provided, the shape and the arrangement of the positioning member can be freely set. In addition, the positional displacement of the operation lever can be suppressed. According to an embodiment of the present disclosure, when the operation lever rotates while being engaged with the positioning member, the operation lever exhibits improved sliding performance relative to the positioning member.

According to an embodiment of the present disclosure, the compact vehicle seat in the seat width direction can be achieved. In addition, the positioning member is securely supported by the side cover. According to an embodiment of the present disclosure, the operation lever can further favorably rotate centered around the lever supporting shaft while being supported by the positioning member. According to an embodiment of the present disclosure, the operation lever is securely supported at the intermediate position serving as a reference position of the operation lever. In addition, an operation feeling of a passenger about the operation lever is improved. According to an embodiment of the present disclosure, in the configuration where the operation lever and the brake unit of the height device are disposed separated from each other, the positional displacement of the operation lever can be suppressed, and the design of the entire seat can be secured.

According to an embodiment of the present disclosure, the interference between components of a vehicle seat can be suppressed in a surrounding area of the operation lever. According to an embodiment of the present disclosure, the design of the entire seat including the operation lever can be secured. According to an embodiment of the present disclosure, a vehicle seat capable of suppressing the number of attachment components while securely attaching the side cover can be achieved. In addition, the looseness and the positional displacement of the side cover can be suppressed, and the design of the entire seat including the side cover can be secured. According to an embodiment of the present disclosure, the side cover can be further securely attached. In addition, the compact vehicle seat in the seat width direction can be achieved.

DETAILED DESCRIPTION

A vehicle seat according to various embodiments of the present disclosure is described below with reference to FIGS. 1 to 6. The embodiments relate to a vehicle seat in which an operation lever and a brake unit of a height device are disposed separated from each other. Using a side cover that covers a cushion frame and the height device from the outside in a seat width direction, the operation lever is positioned to be engaged with a positioning member housed in an outer surface of the side cover. In the description below, a side of a vehicle seat on which a passenger is seated relative to a seat back of the vehicle seat is referred to as a front side.

Figure 1:
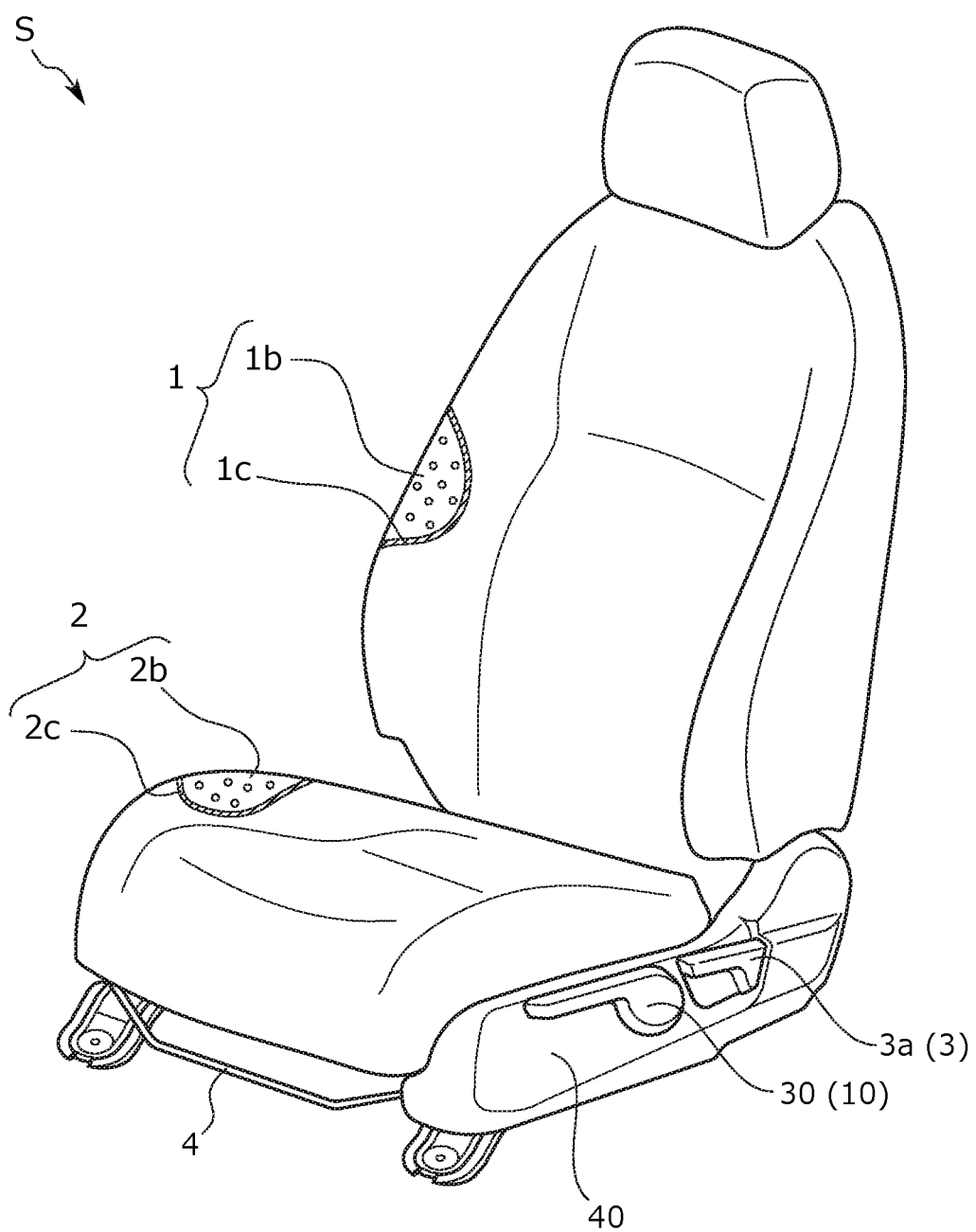
FIG. 1 is a perspective view showing an outer appearance of a vehicle seat, according to an embodiment.

A vehicle seat S according to an embodiment, as shown in FIG. 1, generally includes a seat back 1 serving as a backrest portion, a seat cushion 2 serving as a seating portion, a reclining device 3, a rail device 4, and a height device 10. The reclining device 3 connects the seat back 1 and the seat cushion 2 such that the seat back 1 is rotatable relative to the seat cushion 2. The rail device 4 supports a seat body including the seat back 1 and the seat cushion 2 such that the seat body is movable in a front-to-back direction relative to a vehicle body floor. The height device 10 connects the seat body and the vehicle body floor such that the seat body is movable up and down relative to the vehicle body floor. On an outer side of the seat cushion 2 in the seat width direction, a side cover 40 is provided to protect the reclining device 3, the rail device 4 and the height device 10 from the outside thereof.

As shown in FIG. 1, the seat back 1 includes a cushion pad 1b placed on a back frame (not shown) serving as a framework and a cover material 1c covering the cushion pad 1b. The seat cushion 2 includes a cushion pad 2b placed on a cushion frame 2a serving as a framework shown in FIG. 2 and a cover material 2c covering the cushion pad 2b.

The reclining device 3 can switch between a lock state in which the rotation of the seat back 1 is locked and an unlock state. The reclining device 3 is a well-known device in which a lock state where the seat back 1 is locked in a standing orientation is released by operating an operation handle 3a to adjust the standing orientation of the seat back 1. The operation handle 3a, as shown in FIG. 1, protrudes through a through-hole (not shown) formed on an outer surface of the side cover 40 to be exposed to the outside.

Figure 2:
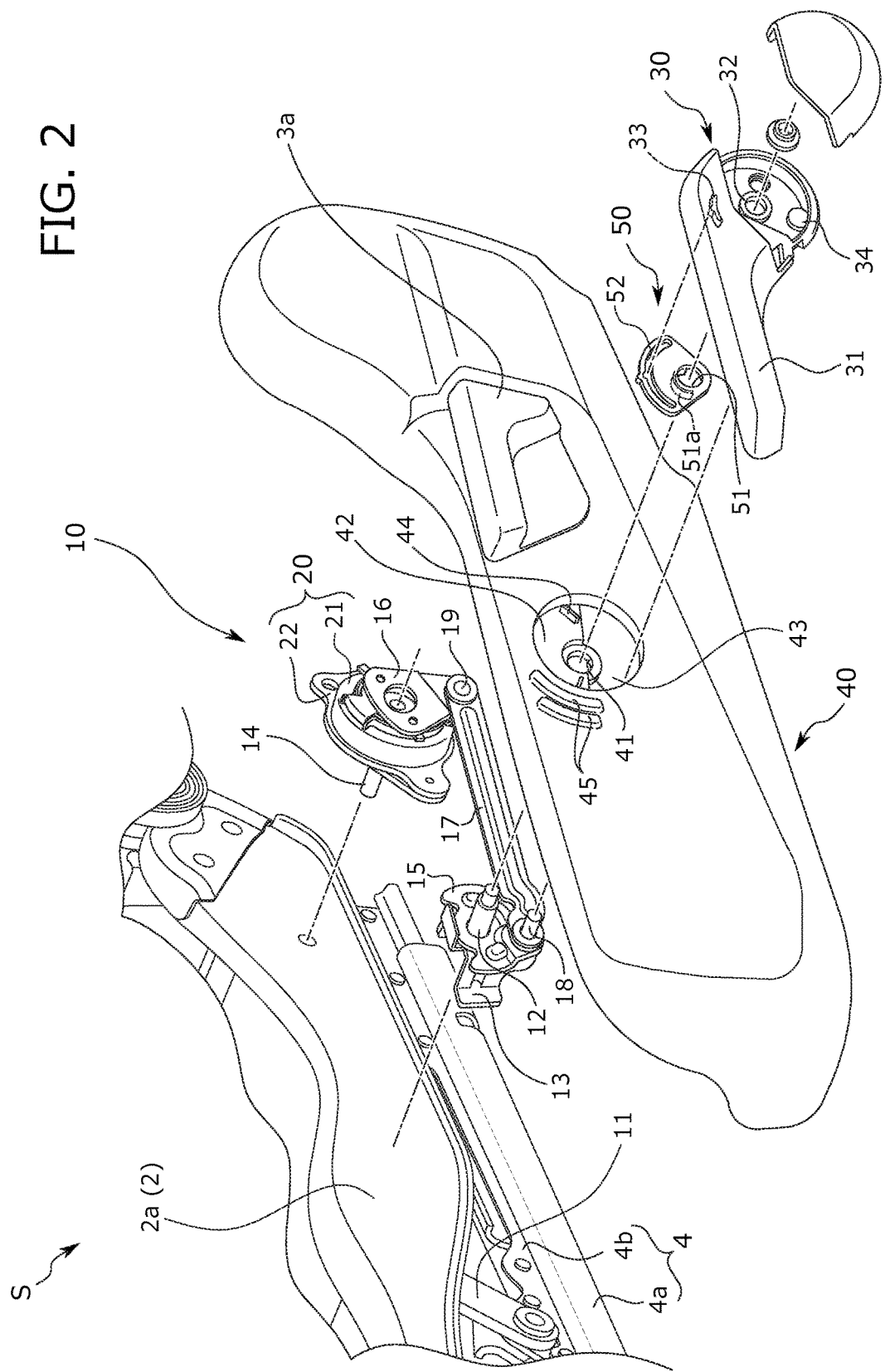
FIG. 2 is an enlarged, partial, perspective view showing a main portion of FIG. 1 and is an exploded view showing a height device and a surrounding area thereof.

The rail device 4 is fixed to the vehicle body floor, as shown in FIG. 2. The rail device 4 is a well-known device that includes right and left lower rails 4a extending in a seat front-to-back direction and right and left upper rails 4b supported to be slidable along the respective lower rails 4a. The cushion frame 2a extends between upper surfaces of the right and left upper rails 4b with the height device 10 interposed therebetween.

As shown in FIG. 2, the height device 10 is attached between the cushion frame 2a and the rail device 4, and includes a pair of front links 11 disposed on the front side of the seat and a pair of rear links (not shown) disposed on the rear side of the seat. The height device 10 is a height link device in which the rear link serving as a drive link can adjust the height of the seat body. A portion of an outer periphery of the drive link has a sector gear portion (not shown) as a gear in a connecting portion which is positioned closer to the cushion frame 2a. The sector gear portion is engaged with a pinion gear (not shown) provided on a laterally inner side of a brake unit 20, as described below.

Figure 3:
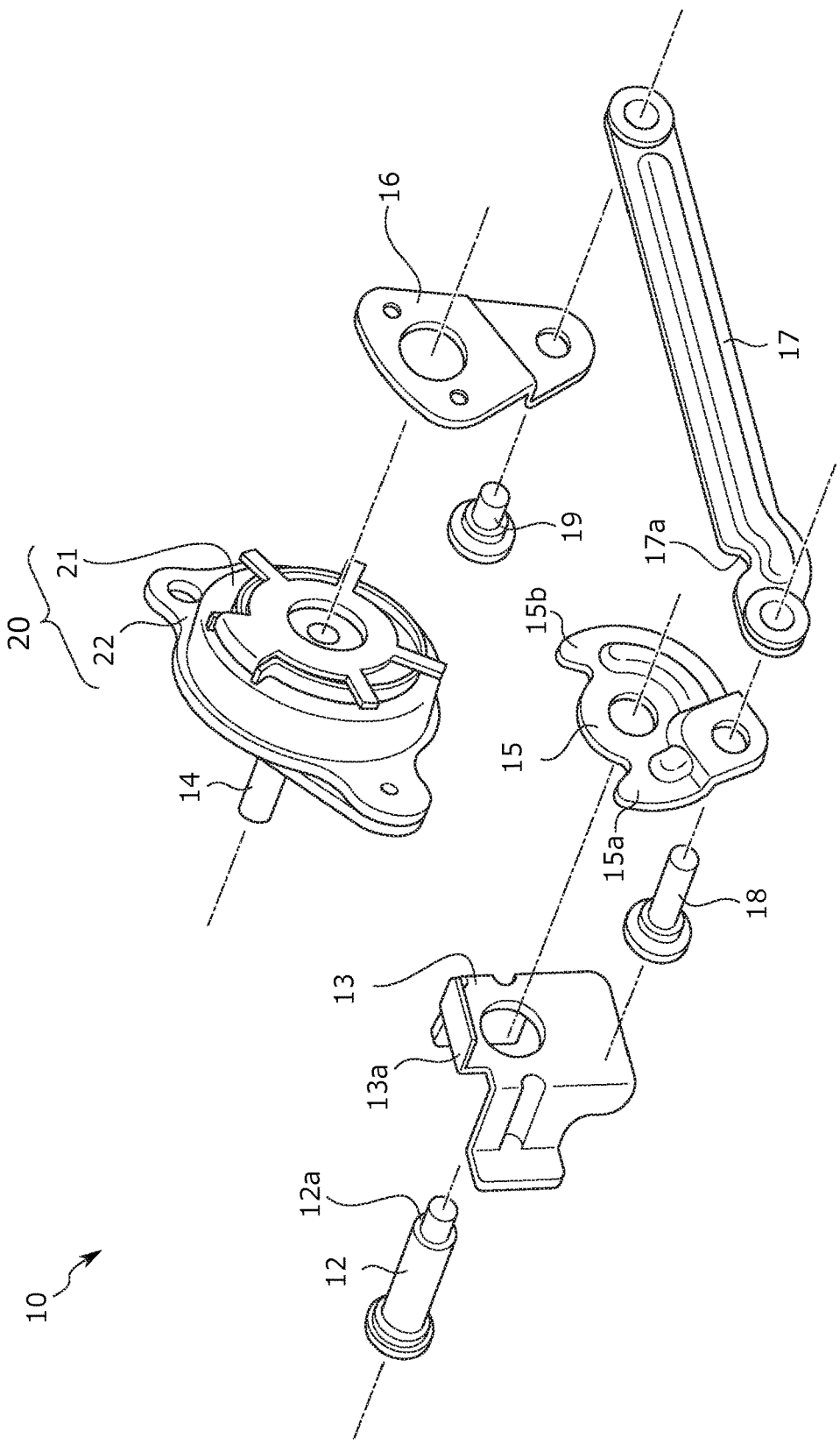
FIG. 3 is an exploded, perspective view showing a four-bar linkage serving as a component of the height device, according to an embodiment.

In addition, the height device 10, as shown in FIGS. 2 and 3, mainly includes a lever supporting shaft 12, a brake rotary shaft 14, an operation lever 30, and a brake unit 20. The lever supporting shaft 12 and the brake rotary shaft 14 protrude outward from a lateral surface of the cushion frame 2a in the seat width direction. The operation lever 30 is attached to be rotatable around the lever supporting shaft 12 and allows the cushion frame 2a to move up and down. The brake unit 20 is attached to be rotatable around the brake rotary shaft 14 and restricts the cushion frame 2a from moving up and down.

The lever supporting shaft 12 is attached to an outer surface of the cushion frame 2a in the seat width direction with a generally U-shaped attachment bracket 13 interposed therebetween. The lever supporting shaft 12 protrudes outward in the seat width direction to extend through the side cover 40 and is connected with the operation lever 30. The brake rotary shaft 14 is attached to extend through the lateral surface of the cushion frame 2a in the seat width direction. A portion of the brake rotary shaft 14, which protrudes outward in the seat width direction, is attached to the brake unit 20. A portion of the brake rotary shaft 14, which protrudes inward in the seat width direction, is connected with the drive link via the pinion gear (not shown).

The lever supporting shaft 12 and the brake rotary shaft 14 are disposed at different positions in the seat front-to-back direction and are connected with each other by a four-bar linkage, as shown in FIGS. 2 and 3. In the four-bar linkage, a lever-side plate 15, through which the lever supporting shaft 12 extends, and a brake-side plate 16, through which the brake rotary shaft 14 extends, are connected to be rotatable relative to each other by a connecting link 17 extending in the seat front-to-back direction.

As shown in FIG. 3, the lever-side plate 15 is rotatable centered around the lever supporting shaft 12. A pair of rotation restricting portions 15a and 15b is provided in a peripheral portion of the lever-side plate 15, which is a portion positioned above the lever supporting shaft 12. The rotation restricting portions 15a and 15b are formed by cutting out the lever-side plate 15. A link connecting shaft 18 extends through a portion of the lever-side plate 15, which is positioned below the lever supporting shaft 12. The brake-side plate 16 is rotatable centered around the brake rotary shaft 14. A portion of the brake-side plate 16, which surrounds the brake rotary shaft 14, is fastened by a bolt or welded to an outer surface of the brake unit 20. A link connecting shaft 19 extends through a portion of the brake-side plate 16, which is positioned below the brake rotary shaft 14.

The connecting link 17 is elongated in the seat front-to-back direction. A front portion thereof is connected with the lever-side plate 15 by the link connecting shaft 18, and a rear portion thereof is connected with the brake-side plate 16 by the link connecting shaft 19. A cutout portion 17a is formed in an upper end portion of the connecting link 17, which is a portion positioned around the link connecting shaft 18, to suppress the interference between the connecting link 17 and the lever supporting shaft 12 and the interference between the connecting link 17 and a positioning member 50 during the operation of the connecting link 17. As shown in FIG. 2, the link connecting shaft 18 protrudes outward in the seat width direction to extend through the side cover 40, and is fitted into the operation lever 30.

In the above configuration, when the lever-side plate 15 rotates forward of the seat, centered around the lever supporting shaft 12, from an intermediate position shown in FIGS. 2 and 3 to a predetermined position, the rotation restricting portion 15a is brought into contact with a contact portion 13a protruded from an outer surface of the attachment bracket 13. Similarly, when the lever-side plate 15 rotates rearward of the seat from the intermediate position to a predetermined position, the rotation restricting portion 15b is brought into contact with the contact portion 13a of the attachment bracket 13.

In the above configuration, in accordance with the rotation of the lever-side plate 15, the brake-side plate 16 rotates via the connecting link 17. The brake-side plate 16 rotates centered around the brake rotary shaft 14 together with the brake rotary shaft 14 and the brake unit 20 such that the rotation power is transmitted to the drive link through the brake rotary shaft 14 and the pinion gear (not shown).

The brake unit 20 has a configuration to provide resistance to the operation of moving up and down the seat body, and is attached to the outer surface of the cushion frame 2a in the seat width direction, as shown in FIGS. 2 and 3. The brake unit 20 mainly includes a generally cylindrical brake body 21 and an attachment plate 22. The brake body 21 rotates centered around the brake rotary shaft 14 together with the brake rotary shaft 14 and the brake-side plate 16. The attachment plate 22 connects the brake body 21 and the cushion frame 2a.

The brake unit 20 is disposed to overlap with the operation handle 3a of the reclining device 3 in the seat width direction with the side cover 40 interposed therebetween. The brake unit 20 is also disposed to overlap the pinion gear (not shown) and the drive link in the seat width direction with the cushion frame 2a interposed therebetween. The brake unit 20 and the operation lever 30 are disposed separated from each other in the seat front-to-back direction, thereby suppressing the interference between the operation lever 30 and the operation handle 3a of the reclining device 3. Therefore, the assembly of the height device 10 and the reclining device 3 is improved, and the degree of freedom for arrangement thereof is enhanced.

Figure 4A:
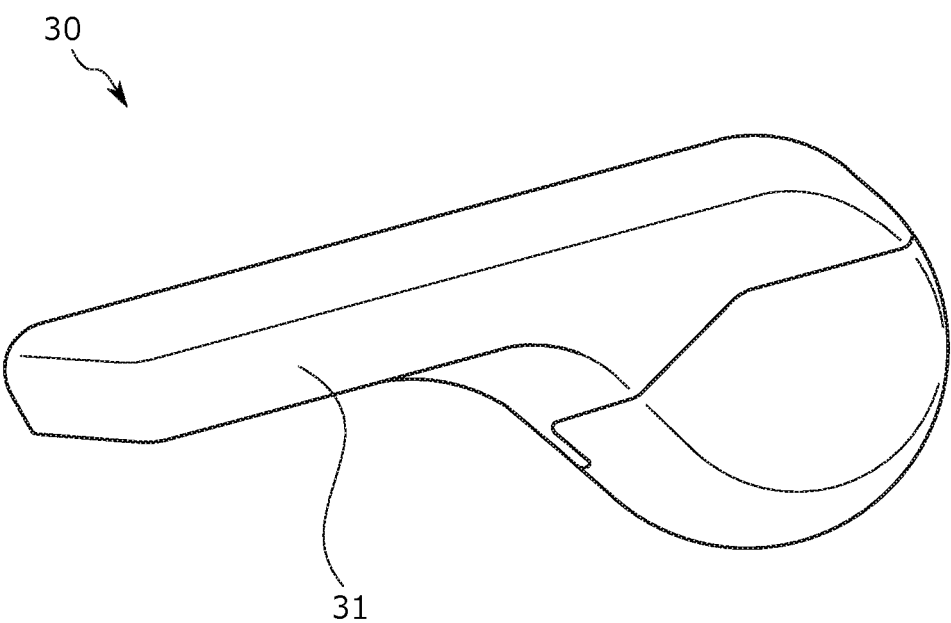
FIG. 4A is a perspective view showing an operation lever of the height device, according to an embodiment.
Figure 4B:
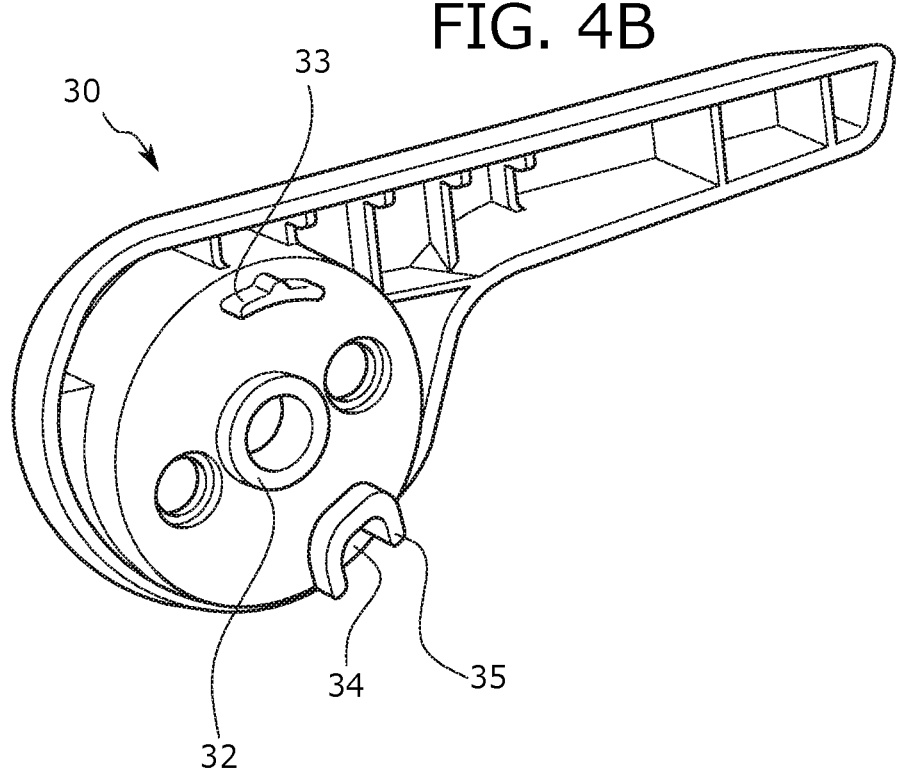
FIG. 4B is a perspective view showing the operation lever of FIG. 4A when viewed from another angle.

The operation lever 30 is held by a passenger to operate the height device 10. As shown in FIG. 2, the operation lever 30 is attached to protrude from the side cover 40 outward in the seat width direction. As shown in FIGS. 2, 4A and 4B, the operation lever 30 is elongated in the seat front-to-back direction and has an inverted L shape in a longitudinal section, and is formed by resin molding to have a generally uniform thickness as a whole. The operation lever 30 has a portion that protrudes outward in the seat width direction, and a front portion of the protruded portion is a holding portion 31 that can be held by the passenger.

In a rear portion of the operation lever 30, a generally circular shaft hole 32 is formed to extend therethrough in the seat width direction. The lever supporting shaft 12 extends through the shaft hole 32. In a surrounding area of the shaft hole 32, a protruded engagement protrusion 33, a fitting recess 34, and a fitting protrusion 35 are formed on an inner surface of the operation lever 30 in the seat width direction. The engagement protrusion 33 protrudes toward the side cover 40. The fitting recess 34 is recessed toward the opposite side of the side cover 40. The fitting protrusion 35 protrudes toward the side cover 40.

The engagement protrusion 33 is on the opposite side of the shaft hole 32 from the fitting recess 34 and the fitting protrusion 35. The engagement protrusion 33 is engaged with an engagement hole 52 provided in the positioning member 50 as described below. A portion of the operation lever 30 in which the fitting recess 34 and the fitting protrusion 35 are fitted to the link connecting shaft 18 is disposed below the lever supporting shaft 12.

The fitting protrusion 35, as shown in FIGS. 4A, 4B, and 5A to 5C, is a generally U-shaped protrusion and has an opening portion that opens to the opposite side of the lever supporting shaft 12. The fitting protrusion 35 protrudes inward in the seat width direction to extend through the side cover 40 and is fitted to the link connecting shaft 18 to be brought into contact with an outer surface of the connecting link 17.

Figure 5A:
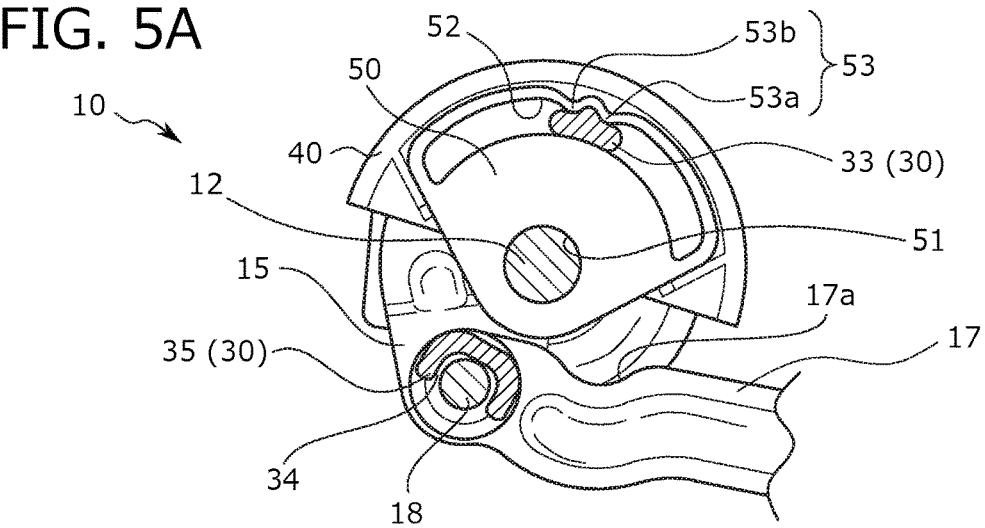
FIG. 5A, FIG. 5B, and FIG. 5C are partial, side views illustrating a rotation of the operation lever relative to a positioning member and showing a longitudinal section of the positioning member and a surrounding area thereof when viewed from the outside in a seat width direction, according to an embodiment.
Figure 5B:
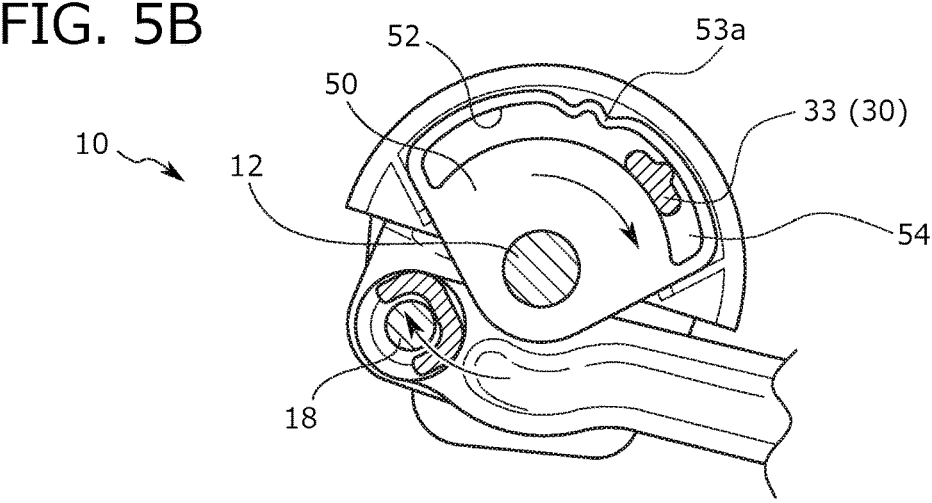
Figure 5C:
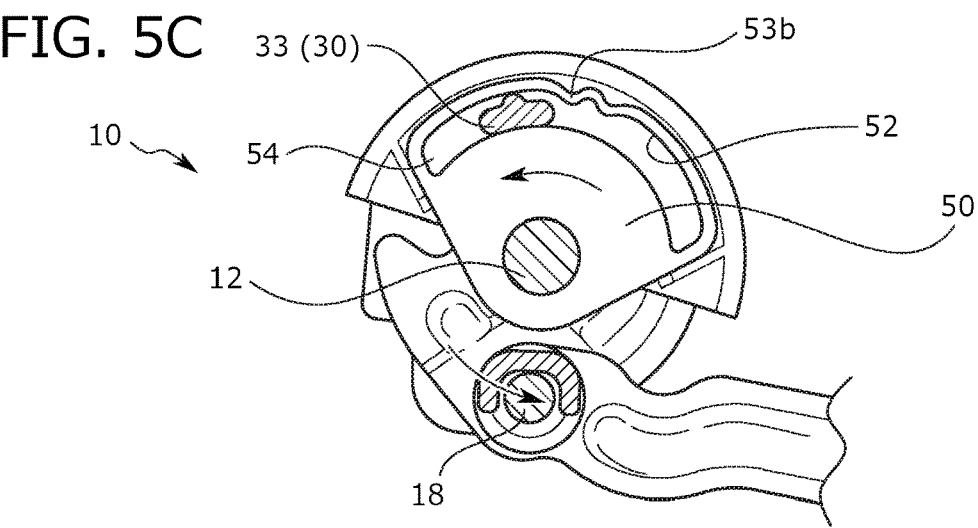

In the above configuration, the operation lever 30 rotates relative to the cushion frame 2a and around the lever supporting shaft 12 while the engagement protrusion 33 is engaged with the engagement hole 52, as shown in FIG. 5A. At this time, the fitting recess 34 is fitted to the link connecting shaft 18. Accordingly, the operation lever 30 rotates centered around the lever supporting shaft 12, and then the lever-side plate 15 operates in accordance with the rotation of the operation lever 30. As a result, by the rotation of the operation lever 30 operated by a passenger, the rotation power is transmitted through a parallel four-bar linkage to the brake unit 20, the brake rotary shaft 14, and the drive link such that the seat body can move up and down.

In addition, in the above configuration, as shown in FIG. 5A, the link connecting shaft 18 is fitted to the generally U-shaped fitting protrusion 35 with a small clearance formed therebetween. Therefore, even if dimensional tolerances, or assembly tolerances, etc. of the linkage are not met, this clearance can compensate for the unmet tolerances.

Furthermore, in the above configuration, the fitting protrusion 35 extends along a direction in which the link connecting shaft 18 extends, and is fitted to the link connecting shaft 18 to surround the link connecting shaft 18 from the outside thereof. Therefore, the fitting protrusion 35 extends to not only an end of the link connecting shaft 18 in the extending direction thereof but also a terminal thereof to be fitted to the link connecting shaft 18, thereby improving the support rigidity of the link connecting shaft 18.

The side cover 40 is a resin plate that covers the seat cushion 2 and the height device 10 from the outside in the seat width direction, as shown in FIG. 2, and in a center portion thereof in the seat front-to-back direction, a generally circular shaft hole 41 is formed. The lever supporting shaft 12 extends through the shaft hole 41 to protrude outward from the cushion frame 2a in the seat width direction. In a surrounding area of the shaft hole 41, a generally semicircular housing recess 42 and a generally semicircular through-hole 43 are formed at different positions on the outer surface of the side cover 40 in the seat front-to-back direction. The housing recess 42 is recessed toward an inner surface of the side cover 40, and the through-hole 43 extends through the side cover 40. The housing recess 42 is on the opposite side of the shaft hole 41 from the through-hole 43 in an up-to-down direction.

The positioning member 50 is housed into the housing recess 42 to position the operation lever 30. A pair of reinforcement ribs 44 is formed on an outer surface of the housing recess 42 to protrude toward the positioning member 50. Specifically, the reinforcement ribs 44 are disposed with the positioning member 50 interposed therebetween in a same circumferential direction centered around the shaft hole 41 to support the positioning member 50. The through-hole 43 is a hole through which the link connecting shaft 18 extends and is formed into a relatively large and generally semicircular hole such that the link connecting shaft 18 can rotate in accordance with the rotation of the operation lever 30 centered around the lever supporting shaft 12.

In a surrounding area of the housing recess 42, contact ribs 45 are formed on the outer surface of the side cover 40 to protrude toward the operation lever 30 and be brought into contact with the inner surface of the operation lever 30. The contact ribs 45 extend in the same circumferential direction centered around the shaft hole 41, and two contact ribs 45 are disposed with a predetermined distance therebetween. In this way, when a passenger operates the operation lever 30, the operation lever 30 is brought into, preferentially, the contact ribs 45 of the side cover 40 to slide. This configuration can suppress the looseness and the positional displacement of the operation lever 30. A contact portion between the operation lever 30 and the side cover 40 is generally difficult to be observed by the passenger, therefore, even if a scratch is caused or deformation occurs in the contact portion, the influence thereof on a seat design is reduced.

The positioning member 50 is a generally fan-shaped resin plate, as shown in FIG. 2, and specifically, the positioning member 50 is made of an elastically deformable resin material that is unlikely to be thermally deformed when the seat is in an operable state. The positioning member 50 is disposed between the side cover 40 and the operation lever 30 in the seat width direction, and specifically, the positioning member 50 is housed in the housing recess 42 of the side cover 40 while being supported by the housing recess 42 and is attached coaxially with the operation lever 30. A generally circular supporting hole 51 and an engagement hole 52 are formed on a lateral surface of the positioning member 50 in the seat width direction. The supporting hole 51 extends through the positioning member 50 coaxially with the shaft hole 32 of the operation lever 30. The engagement hole 52 extends along a same circumference centered around the supporting hole 51.

The supporting hole 51 communicates with the shaft hole 32 of the operation lever 30 and the shaft hole 41 of the side cover 40 to support the lever supporting shaft 12. A generally ring-shaped protrusion 51a is formed in an outer peripheral portion of the supporting hole 51 to protrude inward in the seat width direction and is fitted into the shaft hole 41 of the side cover 40. Therefore, the rigidity of connection between the side cover 40 and the positioning member 50 is enhanced. Particularly, the rigidity in the surrounding areas of the shaft hole 41 and the supporting hole 51 is enhanced to securely support the lever supporting shaft 12.

As shown in FIGS. 2 and 5A, the engagement hole 52 is engaged with the engagement protrusion 33 of the operation lever 30 such that the engagement protrusion 33 can freely move inside the engagement hole 52 in accordance with the rotation of the operation lever 30. Specifically, the engagement hole 52 and the engagement protrusion 33 are partially brought into contact with each other. The engagement protrusion 33 rotates inside the engagement hole 52 while elastically deforming the engagement hole 52.

A stepped portion 53 is formed at a periphery of the engagement hole 52 to have a narrower width than the engagement protrusion 33 in a radial direction centered around the lever supporting shaft 12, as shown in FIG. 5A. The stepped portion 53 is provided around the center portion of the engagement hole 52 in a direction where the engagement hole 52 extends, and includes a first stepped portion 53a and a second stepped portion 53b that are disposed at different positions in the extending direction of the engagement hole 52. The first stepped portion 53a and the second stepped portion 53b are formed such that an outer periphery of the engagement hole 52, namely, an outer periphery of the positioning member 50, is partially recessed toward the lever supporting shaft 12.

In the above configuration, as shown in FIG. 5A, when the operation lever 30 is positioned at an intermediate position within a range where the operation lever 30 rotates, the engagement protrusion 33 of the operation lever 30 is held between the first stepped portion 53a and the second stepped portion 53b that are provided in the engagement hole 52 of the positioning member 50. Therefore, the operation lever 30 is securely supported at the intermediate position, which serves as a reference position. In the above configuration, generally, the seat body moves up when the operation lever 30 of the height device 10 is moved to an upper end position within the rotation range of the operation lever 30, and the seat body moves down when the operation lever 30 is moved to a lower end position therewithin. Therefore, when the operation lever 30 is moved from the intermediate position within the rotation range, as shown in FIG. 5A, to one end position shown in FIG. 5B or another end position shown in FIG. 5C, the engagement protrusion 33 is brought into the first stepped portion 53a or the second stepped portion 53b of the engagement hole 52, respectively, thereby generating a "click" feeling. As a result, an operating feeling of a passenger is improved. A clearance 54 is formed between the engagement protrusion 33 and an end of the engagement hole 52 in the extending direction thereof to allow over-rotation of the operation lever 30 when being moved to the one end position shown in FIG. 5B or the other end position shown in FIG. 5C.

In addition, in the above configuration, when the operation lever 30 is positioned at the intermediate position within the range where the operation lever 30 rotates centered around the lever supporting shaft 12, as shown in FIG. 1, the operation lever 30 is disposed below an upper surface of the side cover 40. Therefore, when the operation lever 30 is positioned at the intermediate position serving as a reference position, the operation lever 30 does not protrude above the side cover 40. As a result, the design of the entire seat including the operation lever 30 can be secured.

Second Embodiment of Vehicle Seat

Figure 6A:
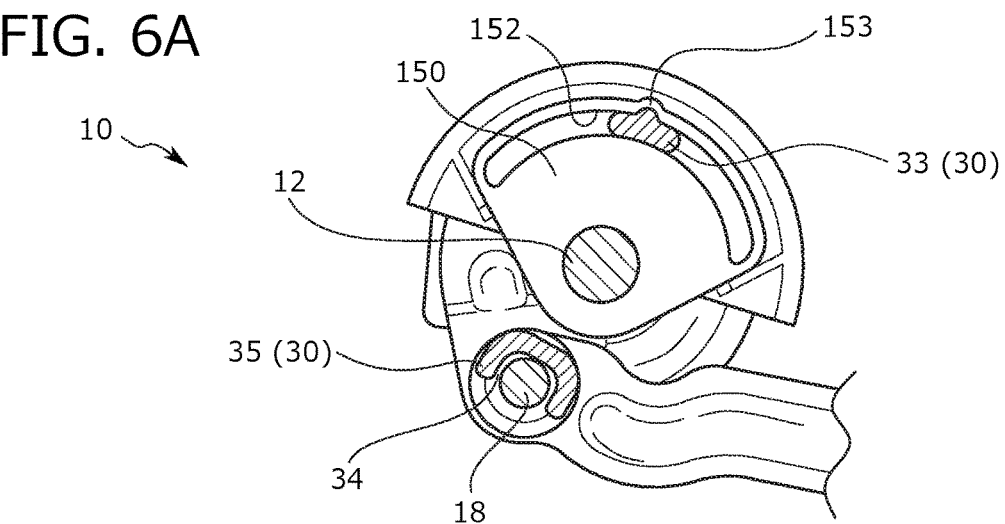
FIG. 6A, FIG. 6B, and FIG. 6C are views illustrating the rotation of the operation lever of FIG. 5, according to another embodiment.
Figure 6B:
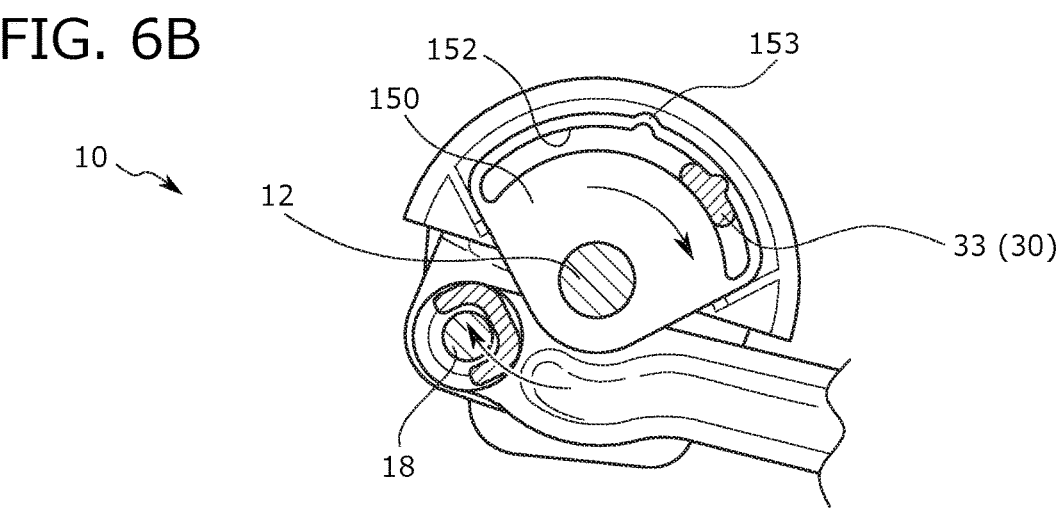
Figure 6C:
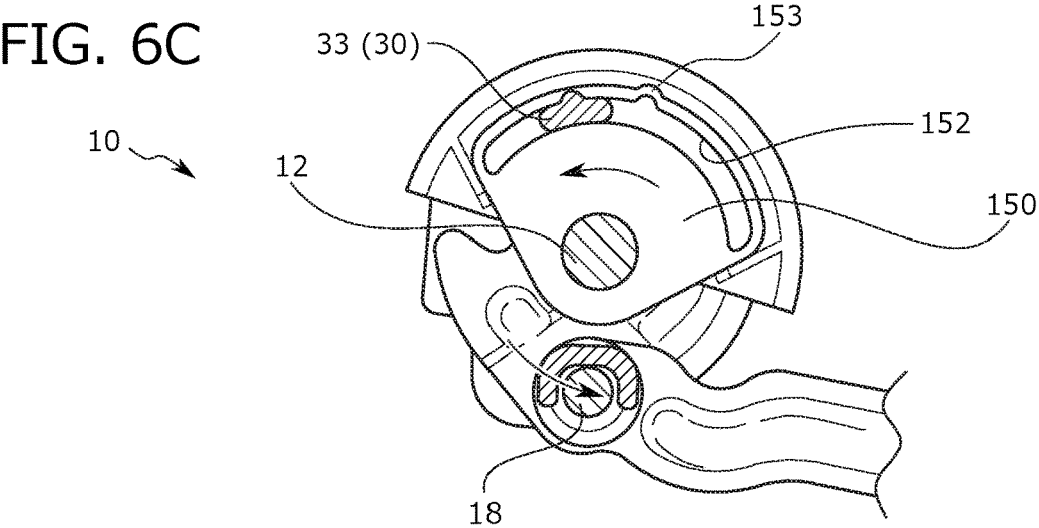

A second embodiment of a vehicle seat S is described next with reference to FIGS. 6A to 6C. The description of the contents that overlap the above-described vehicle seat S is omitted. In the vehicle seat S according to the second embodiment, a shape of an engagement hole 152 of a positioning member 150 is slightly different from that of the engagement hole 52 of the positioning member 50.

A supporting hole 151 and the engagement hole 152 are formed on a lateral surface of the positioning member 150 in the seat width direction. The lever supporting shaft 12 extends through the supporting hole 151. The engagement hole 152 extends along a same circumference centered around the supporting hole 151. At a periphery of the engagement hole 152, as shown in FIG. 6A, a stepped portion 153 is formed to have generally the same width as the engagement protrusion 33 in the radial direction centered around the lever supporting shaft 12. The stepped portion 153 is formed such that an outer periphery of the engagement hole 152 partially protrudes toward the opposite side of the lever supporting shaft 12. According to the above configuration, when the operation lever 30 is moved from the intermediate position shown in FIG. 6A to one end position shown in FIG. 6B or another end position shown in FIG. 6C, the engagement protrusion 33 is brought into contact with the stepped portion 153 of the engagement hole 152, thereby generating a "click" feeling different from that in the first embodiment. As a result, the operating feeling of the passenger is improved.

Other Embodiments

In the above embodiments, the operation lever 30 is a lever for operating the height device 10, however, the invention is not limited to the height device 10 and is applicable for others. For example, the operation lever 30 can be used as a lever for operating a seat adjustment device such as the reclining device 3 or the rail device 4 for adjusting an orientation of the seat.

In the above embodiments, the lever supporting shaft 12 in the operation lever 30 and the brake rotary shaft 14 in the brake unit 20 are arranged at different positions in the seat front-to-back direction. However, the invention is not limited thereto. The lever supporting shaft 12 and the brake rotary shaft 14 may be arranged coaxially with each other, or may be arranged at different positions in the up-to-down direction.

In the above embodiments, an engaging portion of the operation lever 30 is the engagement protrusion 33, and a portion of the positioning member 50 to be engaged by the engaging portion is the engagement hole 52. However, the invention is not limited thereto. A portion of the operation lever 30 may be an engagement hole portion, and a portion of the positioning member 50 may be the engagement protrusion 33. In addition, instead of the engagement protrusion, an engagement pawl, etc. may be utilized.

In the above embodiments, as shown in FIG. 2, the link connecting shaft 18 protrudes outward in the seat width direction to extend through the side cover 40 and is fitted to the fitting recess 34 of the operation lever 30. As shown in FIGS. 4B and 5A, the fitting protrusion 35 of the operation lever 30 protrudes inward in the seat width direction to extend through the side cover 40 and is fitted to the link connecting shaft 18 to surround the link connecting shaft 18 from the outside thereof. In this way, respective fitting protrusions, which protrude at least from one of the linkage and the operation lever 30 toward the other of the linkage and the operation lever 30, are provided in the linkage and the operation lever 30. Therefore, a fastening bolt, etc. is not required to be additionally provided, further enhancing the assembly.

In the above embodiment, the positioning member 50 is formed separately from the side cover 40. However, the positioning member 50 may be provided integrally with the side cover 40. This configuration can reduce the number of components and facilitate assembly operations. In the case where the positioning member 50 is formed separately from the side cover 40, the positioning member 50 may be made of a hard material, and the side cover 40 may be made of a soft material.

In the above embodiments, the positioning member 50 is made of an elastically deformable resin material. Additionally, the positioning member 50 may be made of a material that is unlikely to be thermally deformed when the seat is attached to the vehicle body floor in an operable state. This configuration can improve the positioning performance of the operation lever 30 to suppress the looseness thereof even in a hot season such as summer. The positioning member 50 may be also made of a metal material, for example. The metal material is unlikely to be thermally deformed compared to a commonly-used resin material, etc. Therefore, the positioning performance of the operation lever 30 is improved, and the looseness thereof can be suppressed.

In the above embodiments, a vehicle seat for an automobile has been described as a specific example. However, the invention is not limited thereto. The vehicle seat according to an embodiment of the present disclosure can be applied to not only vehicle seats for trains, buses, etc. but also transportation seats for airplanes, ships, etc. Additionally, the vehicle seat according to an embodiment of the present disclosure can be widely applied to a seat including a seat adjustment device such as the height device.

In the above disclosure, a vehicle seat according to various embodiments of the present disclosure has been described. However, the above embodiments have been set forth as a mere example for the purpose of easy understanding of the invention, and is not intended to limit the invention. Changes and modifications can be made to the embodiments without departing from the scope of the invention, and thus the invention includes all equivalents thereof. Especially, the shapes, arrangement, and configurations of the height device 10, the operation lever 30, the side cover 40 and the positioning member 50, which have been described in the above embodiments, have been set forth as a mere example, and are not intended to limit the invention.

REFERENCE SIGNS LIST

S: vehicle seat
1: seat back
1b, 2b: cushion pad
1c, 2c: cover material
2: seat cushion
2a: cushion frame
3: reclining device
3a: operation handle
4: rail device
4a: lower rail
4b: upper rail
10: height device
11: front link
12: lever supporting shaft
13: attachment bracket
13a: contact portion
14: brake rotary shaft
15: lever-side plate
15a, 15b: rotation restricting portion
16: brake-side plate
17: connecting link
17a: cutout portion
18, 19: link connecting shaft
20: brake unit
21: brake body
22: attachment plate
30: operation lever
31: holding portion
32: shaft hole
33: engagement protrusion
34: fitting recess
35: fitting protrusion
40: side cover
41: shaft hole
42: housing recess
43: through-hole
44: reinforcement rib
45: contact rib
50, 150: positioning member (positioning portion)
51, 151: supporting hole
51a: protrusion
52, 152: engagement hole
53, 153: stepped portion
53a: first stepped portion
53b: second stepped portion
54: clearance

The invention claimed is:

1. A vehicle seat, comprising:
a cushion frame configured as a framework of a seating portion of the vehicle seat;
a height device that connects the cushion frame and a vehicle body floor such that the cushion frame is movable up and down relative to the vehicle body floor; and
a side cover that covers the cushion frame and the height device from an outside of the cushion frame and the height device in a seat width direction;
wherein
the height device includes an operation lever for moving up and down the cushion frame, the operation lever being attached to a supporting shaft that protrudes outward from a lateral surface of the cushion frame in the seat width direction to be rotatable around the supporting shaft, and
a positioning member that is separate from the side cover is provided on a surface of the side cover to position the operation lever, and
the positioning member is attached to the side cover while being supported by the side cover.

2. The vehicle seat according to claim 1,
wherein the operation lever is disposed to protrude outward of the side cover.

3. The vehicle seat according to claim 1, wherein the positioning member is provided on an outer surface of the side cover.

4. The vehicle seat according to claim 1, wherein
the operation lever is disposed to rotate relative to the positioning member while an engaging portion of the operation lever provided on an inner surface of the operation lever is engaged with a portion of the positioning member to be engaged by the engaging portion.

5. The vehicle seat according to claim 4, wherein
the engaging portion is an engagement protrusion that protrudes from the inner surface of the operation lever toward the positioning member,
the portion of the positioning member to be engaged by the engaging portion is an engagement hole that extends through a lateral surface of the positioning member and extends along a same circumference centered around the supporting shaft, and the engagement protrusion is disposed to move inside the engagement hole in accordance with a rotation of the operation lever.

6. The vehicle seat according to claim 5, wherein a stepped portion is formed in the engagement hole to have a narrower width than the engagement protrusion in a radial direction centering of the supporting shaft, the stepped portion being provided around a center portion of the engagement hole in an extending direction of the engagement hole, the engagement protrusion is provided to rotate, centered around the supporting shaft, within a rotation range in accordance with the rotation of the operation lever, and the engagement protrusion is disposed to be in contact with the stepped portion when positioned at an intermediate position within the rotation range.

7. The vehicle seat according to claim 6, wherein the stepped portion includes a first stepped portion and a second stepped portion that are disposed at different positions in the extending direction, and the engagement protrusion is disposed between the first stepped portion and the second stepped portion in the extending direction at the intermediate position within the rotation range.

8. The vehicle seat according to claim 5, wherein the supporting shaft is a lever supporting shaft, the height device includes a brake unit attached to a brake rotary shaft that protrudes from the lateral surface of the cushion frame to be rotatable around the brake rotary shaft, the brake unit providing a resistance to an operation of moving up and down the cushion frame, the lever supporting shaft and the brake rotary shaft are disposed at different positions in a seat front-to-back direction, and the operation lever and the brake unit are connected to operate in accordance with each other.

9. The vehicle seat according to claim 8, wherein the engagement protrusion is disposed on an opposite side of the lever supporting shaft from portions of the operation lever, which are connected with each other such that the brake unit accordingly operates.

10. The vehicle seat according to claim 1, wherein the positioning member is housed in a housing recess provided on an outer surface of the side cover, and a reinforcement rib is formed on the outer surface of the housing recess to protrude toward the positioning member.

11. The vehicle seat according to claim 1, wherein the positioning member is disposed between the side cover and the operation lever in the seat width direction and is attached coaxially with the operation lever.

12. The vehicle seat according to claim 1, wherein the positioning member is made of an elastically deformable resin material.

13. The vehicle seat according to claim 1, wherein the operation lever is disposed at generally a same height as or at a lower position than an upper surface of the side cover when the operation lever is positioned at an intermediate position within a rotation range where the operation lever rotates centering around the supporting shaft.

14. The vehicle seat according to claim 1, wherein the supporting shaft is provided to protrude outward from a lateral surface of the cushion frame in the seat width direction and is disposed to extend through a shaft hole provided on a lateral surface of the side cover in the seat width direction to support the side cover.

15. The vehicle seat according to claim 14, wherein a surrounding portion of the shaft hole in the side cover is a recess recessed in the seat width direction.

* * * * *